United States Patent
Murakami et al.

(10) Patent No.: US 7,281,604 B2
(45) Date of Patent: Oct. 16, 2007

(54) ELECTRIC POWER STEERING APPARATUS

(75) Inventors: Tetsuya Murakami, Nara (JP);
Takehiro Saruwatari, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 369 days.

(21) Appl. No.: 10/800,715

(22) Filed: Mar. 16, 2004

(65) Prior Publication Data

US 2004/0182190 A1    Sep. 23, 2004

(30) Foreign Application Priority Data

Mar. 17, 2003    (JP) ............................ 2003-071859

(51) Int. Cl.
*B62D 5/04*    (2006.01)
(52) U.S. Cl. ................ 180/444; 74/424.81; 74/499
(58) Field of Classification Search ............ 180/444; 74/499, 465, 441, 424.71, 424.81, 89.23, 74/388 PS
See application file for complete search history.

(56) References Cited

U.S. PATENT DOCUMENTS

| | | | | |
|---|---|---|---|---|
| 2,936,645 A | * | 5/1960 | Morris et al. .................. | 74/441 |
| 4,493,222 A | | 1/1985 | Heine | |
| 4,680,982 A | * | 7/1987 | Wilke et al. ............. | 74/424.75 |
| 5,697,252 A | * | 12/1997 | Yamaguchi et al. .......... | 74/441 |
| 6,334,370 B1 | * | 1/2002 | Sonoda et al. ........... | 74/424.81 |
| 6,378,646 B1 | * | 4/2002 | Bugosh ...................... | 180/444 |
| 6,991,062 B2 | * | 1/2006 | Yoshida et al. ............. | 180/444 |
| 2002/0040614 A1 | | 4/2002 | Grosspietsch et al. | |

FOREIGN PATENT DOCUMENTS

| | | |
|---|---|---|
| JP | 4-203550 A | 7/1992 |
| JP | 2000-39052 A | 2/2000 |
| JP | 2001-122136 A | 5/2001 |
| JP | 2002-5178 A | 1/2002 |
| JP | 2002-266976 A | 9/2002 |

* cited by examiner

*Primary Examiner*—Tony Winner
(74) *Attorney, Agent, or Firm*—Birch, Stewart, Kolasch & Birch, LLP

(57) ABSTRACT

An electric power steering apparatus for converting rotation of a steering assist motor into movement of a steering shaft in the axial direction thereof in accordance with steering operation using a ball screw mechanism wherein a female thread groove formed around an inner circumference of a rotating cylinder rotated around the axis thereof by the motor and a male thread groove formed around an outer circumference of the steering shaft are screwed with each other via a plurality of balls. The portions, where the both thread grooves contact with the balls, are formed in a circular arc shape, respectively, and the curvature of the female thread groove is made smaller than that of the male thread groove. Hence, the ball screw mechanism wherein skew occurrence between the ball and both the thread grooves is prevented and the dimensional errors of both the thread groove are decreased is realized.

8 Claims, 3 Drawing Sheets

ELECTRIC POWER STEERING APPARATUS

This Nonprovisional application claims priority under 35 U.S.C. § 119(a) on Patent Application No. 2003-071859 filed in JAPAN on Mar. 17, 2003, the entire contents of which is hereby incorporated by reference.

BACKGROUND OF THE INVENTION

1. Field of the Invention

The present invention relates to an electric power steering apparatus for converting the rotational motion of a steering assist motor into the linear motion of a steering shaft by using the ball screw mechanism which converts rotational motion into linear motion or converts linear motion into rotational motion.

2. Description of Related Art

Ball screw mechanisms for converting the rotational motion of a rotating drive source, such as an electric motor, into linear motion or conversely converting linear motion into rotational motion are used in various industrial fields. For example, a ball screw mechanism is used in an electric power steering apparatus having a steering assist motor and driven in accordance with steering operation. This kind of electric power steering apparatus uses a ball screw mechanism wherein a female thread groove formed around the inner circumference of a cylindrical ball nut rotated around the axis thereof by a steering assist motor is meshed with a male thread groove formed around the outer circumference of the rack shaft (steering shaft) of a rack-and-pinion steering screwed via a plurality of balls, whereby the rotational motion of the steering assist motor is converted into linear motion in the axial direction of the rack shaft (for example, see Japanese Patent Application Laid-open No. 2001-122136.).

FIG. 1 is a schematic cross-sectional view, taken in the axial direction, showing the shape of the screwing portion of a conventional ball screw mechanism. Reference numeral 11 denotes a cross-section of a rack shaft, and reference numeral 13 denotes a cross-section of a ball nut. A male thread groove 11a formed around the outer circumference of the rack shaft 11 is screwed with a female thread groove 13a formed around the inner circumference of the ball nut 13 via a plurality of balls 14 (only one ball is shown in FIG. 1). Portions (contact portions) of the cross-section, where the male thread groove 11a and the female thread groove 13a contact with the ball 14, are each formed in a composite round shape (gothic arc shape) that is obtained when two discrete round shapes are combined so as to intersect at the bottom of the thread groove.

In the conventional ball screw mechanism having the thread grooves formed in such composite round shape, in the case when the clearance between the ball 14 and each of the male thread groove 11a and the female thread groove 13a is made smaller, the ball 14 makes contact with the thread grooves at four points. More specifically, the ball 14 makes contact with each of the thread grooves 11a and 13a at two points, respectively. This has a problem of causing skew. In addition, it is difficult to form the right and left two discrete round shapes, which are combined to form the composite round shape at each of the thread grooves 11a and 13a, having exactly the same dimensions and shape. This has a problem of being apt to cause dimensional errors.

BRIEF SUMMARY OF THE INVENTION

In view of the above-mentioned circumstances, the present invention is intended to provide an electric power steering apparatus incorporating a ball screw mechanism capable of preventing skew from occurring between the ball and the thread grooves and capable of decreasing the dimensional errors of the thread grooves.

A first aspect of the electric power steering apparatus in accordance with the present invention is an electric power steering apparatus for converting the rotation of a steering assist motor into the movement of a steering shaft in the axial direction thereof in accordance with steering operation by using a ball screw mechanism wherein a female thread groove formed around an inner circumference of a rotating cylinder rotated around the axis thereof by the steering assist motor and a male thread groove formed around an outer circumference of the steering shaft are screwed with each other via a plurality of balls, characterized in that portions of cross-section, where the female thread groove and the male thread groove contact with the balls, are formed in a circular arc shape, respectively and a curvature of the female thread groove is smaller than that of the male thread groove.

In the first aspect of the electric power steering apparatus in accordance with the present invention, portions of the cross-section, where the female thread groove and the male thread groove of the ball screw mechanism contact with the ball, are formed in a circular arc shape (single round shape), respectively. Hence, in the case where the clearance between the ball and each of the female thread groove and the male thread groove is made smaller, the ball makes contact with each of the thread grooves at one point, that is, the ball makes contact with both the thread grooves totally at two points. In addition, a curvature of the female thread groove is made smaller than that of the male thread groove (a curvature radius of the female thread groove is made larger than that of the male thread groove). As the curvature is smaller (the curvature radius is larger), the area of the thread groove making contact with the ball is smaller, and the pressure on the contact face is higher. Hence, since the curvature of the female thread groove is made smaller than that of the male thread groove (the curvature radius thereof is made larger), the pressure on the contact face on the rotating cylinder side on the drive side to which the rotation force of a steering assist motor is applied becomes higher than the pressure on the contact face on the steering shaft side. This improves driving efficiency.

A second aspect of the electric power steering apparatus as set forth in the first aspect of the electric power steering apparatus in accordance with the present invention is characterized in that a curvature radius of the female thread groove is in the range of 53.5 to 85% of the diameter of the ball, and a curvature radius of the male thread groove is in the range of 52.5 to 75% of the diameter of the ball.

In the second aspect of the electric power steering apparatus in accordance with the present invention, a curvature radius of the female thread groove formed around the inner circumference of the rotating cylinder of the ball screw mechanism is set in the range of 53.5 to 85% of the diameter of the ball. In addition, a curvature radius of the male thread groove formed around the outer circumference of the steering shaft is set in the range of 52.5 to 75% of the diameter of the ball. By setting the curvature radii of both the thread grooves so as to be larger than 52.5% of the diameter of the ball, the balls can be fitted in both the thread grooves with a margin. Furthermore, by setting the curvature radii of both the thread grooves so as to be smaller than 85% of the diameter of the ball, the pressures on the faces of both the thread grooves making contact with the ball can be maintained at a limit value or less.

The above and further objects and features of the invention will more fully be apparent from the following detailed description with accompanying drawings.

DETAILED DESCRIPTION OF THE PREFERRED EMBODIMENTS

The present invention will be described below specifically on the basis of the drawings showing the embodiments thereof.

Figure 1:
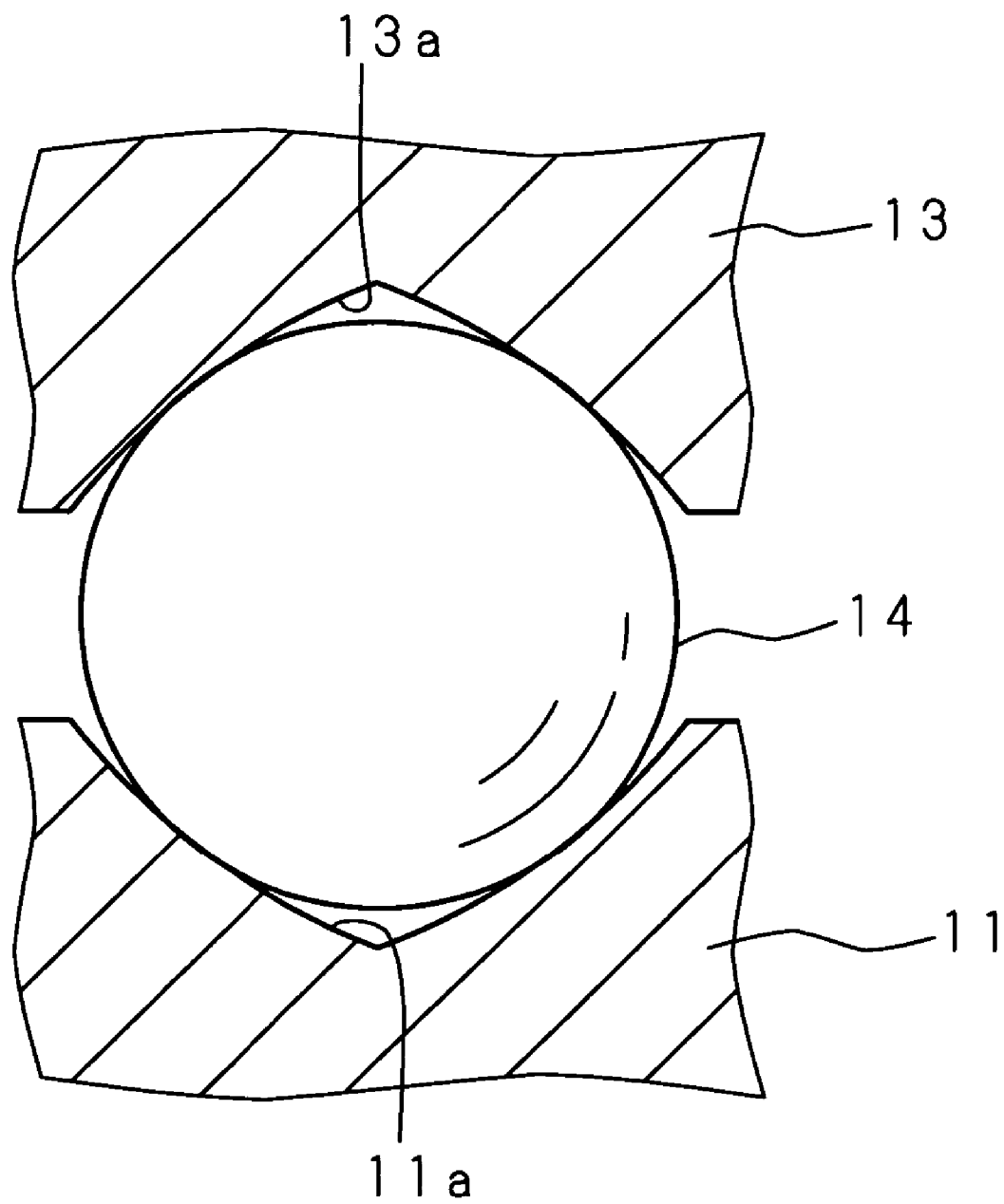
FIG. 1 is a schematic cross-sectional view, taken in the axial direction, showing the shape of the screwing portion of the conventional ball screw mechanism.
Figure 2:
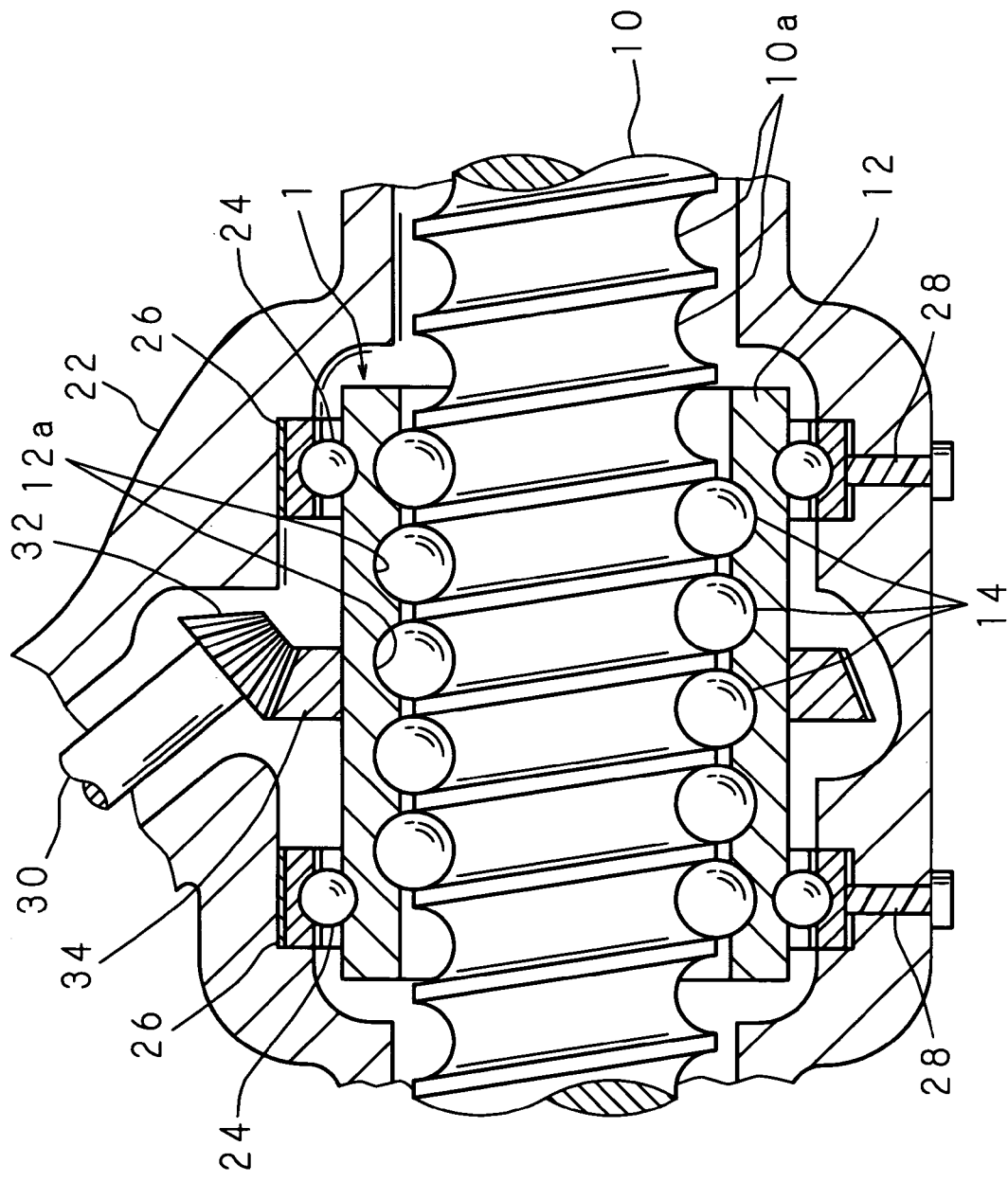
FIG. 2 is a schematic cross-sectional view showing a configuration example of an electric power steering apparatus in accordance with the present invention.

FIG. 2 is a schematic cross-sectional view showing a configuration example of an electric power steering apparatus in accordance with the present invention. A ball screw mechanism 1 has a cylindrical ball nut (rotating cylinder) 12 rotated around the axis thereof by a steering assist motor (not shown) and a rack shaft (steering shaft) 10 of a rack-and-pinion steering mechanism. In addition, a female thread groove 12a formed around the inner circumference of the ball nut 12 and a male thread groove 10a formed helically around the outer circumference of the rack shaft 10 are screwed with each other via a plurality of balls 14.

The ball nut 12 of the ball screw mechanism 1 is rotatably supported at two positions in the axial direction inside a housing 22 by ball bearings 24 in which the ball nut 12 is used as the inner ring thereof. Furthermore, a bevel gear 34 is mounted around the outer circumstance of the ball nut 12. This bevel gear 34 is meshed with a bevel gear 32 mounted at the tip of a rotating shaft 30 rotated by the steering assist motor (not shown).

When the rotating shaft 30 is rotated by the steering assist motor, a torque is transmitted from the bevel gear 32 to the bevel gear 34, and the ball nut 12 inside the housing 22 is rotated around the axis thereof. When the ball nut 12 is rotated around the axis, the balls 14 roll while maintaining the engagement with the male thread groove 10a of the rack shaft 10. Hence, the rack shaft 10 is pushed in the axial direction by the axial component of a force applied to the male thread groove 10a at the positions engaged with the balls 14. As a result, the rack shaft 10 is moved in the axial direction (in the right-and-left direction of FIG. 2) by the rotation of the steering assist motor, whereby steering assist is carried out.

Figure 3:
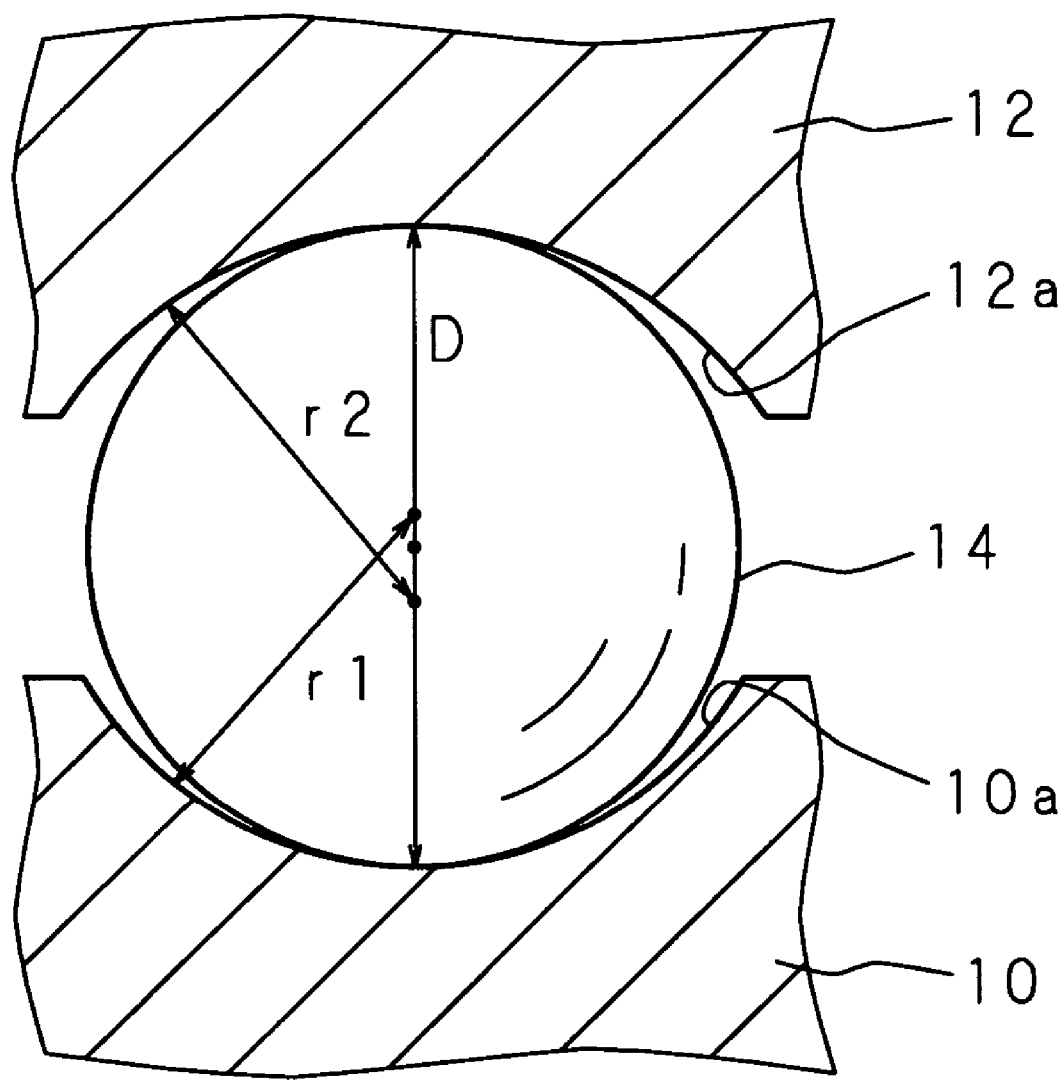
FIG. 3 is a schematic cross-sectional view, taken in the axial direction, showing the shape of the screwing portion of the ball screw mechanism incorporated in the electric power steering apparatus in accordance with the present invention.

FIG. 3 is a schematic cross-sectional view, taken in the axial direction, showing the shape of the screwing portion of the ball screw mechanism incorporated in the electric power steering apparatus in accordance with the present invention.

Portions (contact portions) of the cross-section, where the male thread groove 10a formed around the outer circumstance of the rack shaft 10 and the female thread groove 12a formed around the inner circumference of the ball nut 12 contact with the ball 14, are formed in a circular arc shape (single round shape) having its apex at the bottom of the thread groove.

As described above, in the ball screw mechanism incorporated in the electric power steering apparatus in accordance with the present invention, each contact portion, where the male thread groove 10a or the female thread groove 12a contacts with the ball 14, is formed in the single round shape. Hence, in the case when the clearance between the ball 14 and each of the male thread groove 10a and the female thread groove 12a is made smaller, the ball 14, makes contact with each thread groove 10a and 12a at two points, respectively, whereby skew occurrence can be prevented. In addition, since each contact portion, where the male thread groove 10a and the female thread groove 12a contacts with the ball 14, is formed in the discrete round shape, respectively, the dimensional errors between the both thread grooves 10a and 12a are decreased.

However, the curvature of the male thread groove 10a is made larger than that of the female thread groove 12a. In other words, the curvature radius r1 of the male thread groove 10a is smaller than the curvature radius r2 of the female thread groove 12a. As the curvature radius of the thread groove is larger, the area of the thread groove making contact with the ball 14 is smaller, and the pressure on the contact face is higher. Hence, in the case when r2 is larger than r1, the pressure on the contact face of the ball nut 12 on the drive side to which the rotation force of the steering assist motor is applied becomes higher than the same on side of the rack shaft 10. This improves drive efficiency.

Furthermore, when the diameter of the ball 14 is D, the curvature radius r1 of the male thread groove 10a is in the following range:

$$0.525 \times D \leq r1 \leq 0.75 \times D.$$

and the curvature radius r2 of the female thread groove 12a is in the following range:

$$0.535 \times D \leq r2 \leq 0.85 \times D.$$

In order that the balls 14 are fitted in the male thread groove 10a and the female thread groove 12a, their curvature radii (r1 and r2) are required to be larger than 0.5×D. Therefore, the curvature radius r1 of the male thread groove 10a is set at 0.525×D or more, and the curvature radius r2 of the female thread groove 12a is made larger than r1 and set at 0.535×D or more.

In addition, the pressure on the contact face increases as the curvature radius becomes larger. Hence, in consideration of the limit value of the pressure on the contact face, the curvature radius r2 of the female thread groove 12a is set at 0.85×D or less, and the curvature radius r1 of the male thread groove 10a is set at 0.75×D or less, a value of which is smaller than r2.

In order that the balls 14 are fitted in the male thread groove 10a and the female thread groove 12a with a margin, the curvature radius r1 of the male thread groove 10a is preferably 0.60×D or more, and the curvature radius r2 of the female thread groove 12a is preferably 0.61×D or more.

Furthermore, in order that a margin is provided for the limit of the pressure on the contact face, the curvature radius r1 of the male thread groove 10a is preferably 0.70×D or less, and the curvature radius r2 of the female thread groove 12a is preferably 0.75×D or less.

Moreover, in the case-where both the curvature radius r1 of the male thread groove 10a and the curvature radius r2 of the female thread groove 12a are larger than the radius (D/2) of the ball 14, the thrust rigidity of the steering shaft 10, that is, the rigidity in the axial direction thereof, is lowered. Therefore, at the start of steering, the ball nut 12 moves slightly in the thrust direction without rotating, whereby steering can be started smoothly.

In addition, two threaded holes 29 are formed at positions opposed to the two ball bearings 24, respectively, on the opposite side of the rotating shaft 30 of the housing 22. Furthermore, elastic member 26 is held between the inner face of the housing 22 on the side of the rotating shaft 30 and each ball bearing 24. When screws 28 are screwed into the above-mentioned two threaded holes 29 and tightened, respectively, both the ball bearings 24 are moved toward the rotating shaft 30 inside the housing 22 while pushing the elastic members 26, respectively. Moreover, when both the screws 28 are loosened, both the ball bearings 24 are moved away from the rotating shaft 30 inside the housing 22 by the resilience of both the elastic members 26, respectively.

In the case when the screws 28 are tightened or loosened as described above, the ball nut 12 and the bevel gear 34 are also moved together with the ball bearings 24 inside the housing 22. Accordingly, by tightening or loosening the screws 28, the clearance between the bevel gear 32 mounted on the rotating shaft 30 and the bevel gear 34 mounted on the ball nut 12, that is, the meshing state of the bevel gears, can be adjusted.

In the case when the clearance between the bevel gears 32 and 34 is too small, the friction therebetween increases, and rotation becomes difficult. On the contrary, in the case when the clearance is too large, there is a fear of causing a backlash. Hence, the adjustment of the clearance between the bevel gears 32 and 34 is difficult. However, in the present invention, the clearance between the bevel gears 32 and 34 can be adjusted easily and precisely by tightening or loosening the screws 28.

As described above, according to the present invention, the portions, where the male thread groove and the female thread groove of the ball screw mechanism contact with the ball, are formed in the circular arc shape (single round shape), whereby the dimensional errors of the thread grooves are decreased. In addition, the ball makes contact with the male thread groove and the female thread groove of the ball screw mechanism at two points, more specifically, the ball makes contact with each of the male thread groove and the female thread groove of the ball screw mechanism at one point, respectively, whereby skew occurrence can be prevented.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An electric power steering apparatus for converting the rotation of a steering assist motor into the movement of a steering shaft in the axial direction thereof in accordance with steering operation by using a ball screw mechanism wherein a female thread groove formed around an inner circumference of a rotating cylinder rotated around the axis thereof by said steering assist motor and a male thread groove formed around an outer circumference of said steering shaft are screwed with each other via a plurality of balls, wherein portions of cross-section, where said female thread groove and said male thread groove contact with said balls, are formed in a circular arc shape, respectively, and a curvature of said female thread groove is smaller than that of said male thread groove;

wherein a curvature radius of said female thread groove is in the range of 53.5 to 85% of the diameter of said balls, and a curvature radius of said male thread groove is in the range of 52.5 to 75% of the diameter of said balls.

2. The electric power steering apparatus of claim 1 wherein the curvature of a bottom of the male thread groove is not less than the curvature of said balls.

3. An electric power steering apparatus for converting the rotation of a steering assist motor into the movement of a steering shaft in the axial direction thereof in accordance with steering operation by using a ball screw mechanism wherein a female thread groove formed around an inner circumference of a rotating cylinder rotated around the axis thereof by said steering assist motor and a male thread groove formed around an outer circumference of said steering shaft are screwed with each other via a plurality of balls, wherein portions of cross-section, where said female thread groove and said male thread groove contact with said balls, are formed in a circular arc shape, the apex of said circular arc shape being the bottom of each thread groove, respectively, and a curvature of said female thread groove is smaller than that of said male thread groove.

4. The electric power steering apparatus as set forth in claim 3, wherein a curvature radius of said female thread groove is in the range of 53.5 to 85% of the diameter of said balls, and a curvature radius of said male thread groove is in the range of 52.5 to 75% of the diameter of said balls.

5. The electric power steering apparatus of claim 3 wherein the curvature of the bottom of the male thread groove is not less than the curvature of said balls.

6. An electric power steering apparatus for converting the rotation of a steering assist motor into axial movement of a steering shaft in accordance with a steering operation, the electric power steering apparatus comprising:

a rotatable cylinder surrounding a portion of the steering shaft, the rotatable cylinder having a female thread groove formed around an inner circumference of the rotatable cylinder, the rotatable cylinder being rotatable by a steering assist motor;

a male thread groove formed around an outer circumference of said steering shaft; and a plurality of balls in the male thread groove and the female thread groove between the rotatable cylinder and the steering shaft, wherein:

the female thread groove has an arc-shaped bottom, having a first curvature, contacting said balls and the male thread groove has an arc-shaped bottom, having a second curvature, contacting said balls;

wherein said first curvature is less than said second curvature.

7. The electric power steering apparatus as set forth in claim 6, wherein a curvature radius of said female thread groove is in the range of 53.5 to 85% of the diameter of said balls, and a curvature radius of said male thread groove is in the range of 52.5 to 75% of the diameter of said balls.

8. The electric power steering apparatus of claim 6 wherein the second curvature is not less than the curvature of said balls.

* * * * *